United States Patent [19]

McCrory et al.

[11] Patent Number: 4,577,975
[45] Date of Patent: Mar. 25, 1986

[54] MIXING AND BLENDING APPARATUS

[75] Inventors: Carl E. McCrory, West Covina; Herbert G. Hall, Calabassas, both of Calif.

[73] Assignee: Carl McCrory Enterprises, Inc., West Covina, Calif.

[21] Appl. No.: 650,278

[22] Filed: Sep. 14, 1984

Related U.S. Application Data

[63] Continuation-in-part of Ser. No. 608,641, May 9, 1984, abandoned.

[51] Int. Cl.⁴ ............................................. B01F 7/10
[52] U.S. Cl. ..................................... 366/314; 366/205; 366/317; 277/68; 403/14; 403/354; 403/361
[58] Field of Search ............... 366/314, 315, 316, 317, 366/205, 331, 349; 277/67, 68, 69; 403/354, 361, 13, 14

[56] References Cited

U.S. PATENT DOCUMENTS

| | | |
|---|---|---|
| 729,806 | 6/1903 | Stoueken. |
| 1,304,349 | 5/1919 | Moore. |
| 2,159,856 | 5/1939 | Lean. |
| 2,755,900 | 7/1956 | Seyfried ............................. 366/205 |
| 2,918,264 | 12/1959 | Ackles. |
| 2,930,596 | 3/1960 | Waters ............................. 366/314 |
| 3,273,865 | 9/1966 | White. |
| 3,404,870 | 10/1968 | Multer. |
| 3,488,038 | 1/1970 | Staf. |
| 3,542,178 | 11/1970 | Ripple ............................. 366/205 |
| 3,848,524 | 11/1974 | Semrow ............................. 366/205 |

Primary Examiner—Robert W. Jenkins
Attorney, Agent, or Firm—Paul R. Wylie

[57] ABSTRACT

A mixer assembly including a container having a rotatable impeller therein and a motor base having a casing and a drive shaft in the casing adapted to be coupled to and drive the impeller in the container. The drive shaft in the casing extending through an opening in the casing and having a disk fixed to the shaft for rotation therewith. The disk being positioned above the opening in the casing and extending radially outwardly over the opening whereby liquid contacting the upper surface of the disk will be spun off as the disk rotates.

12 Claims, 9 Drawing Figures

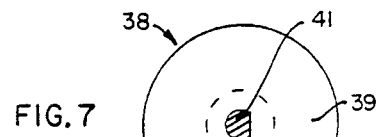
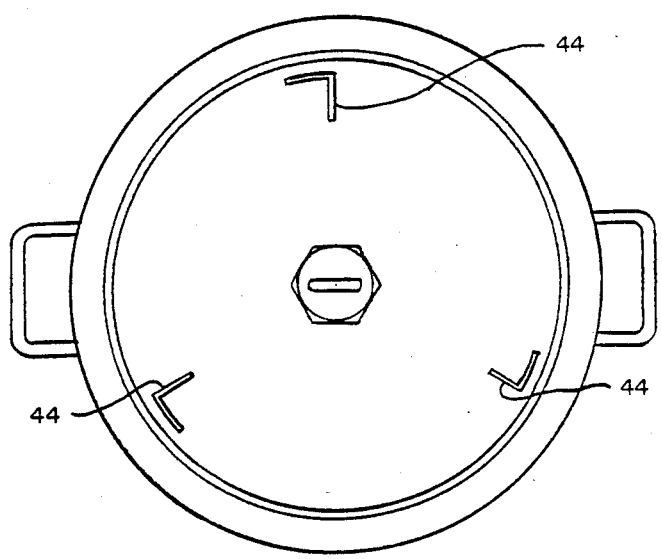
FIG.6
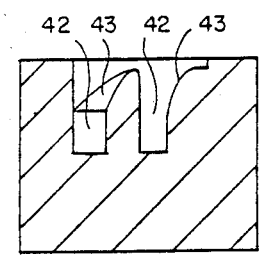
FIG.7
FIG.8
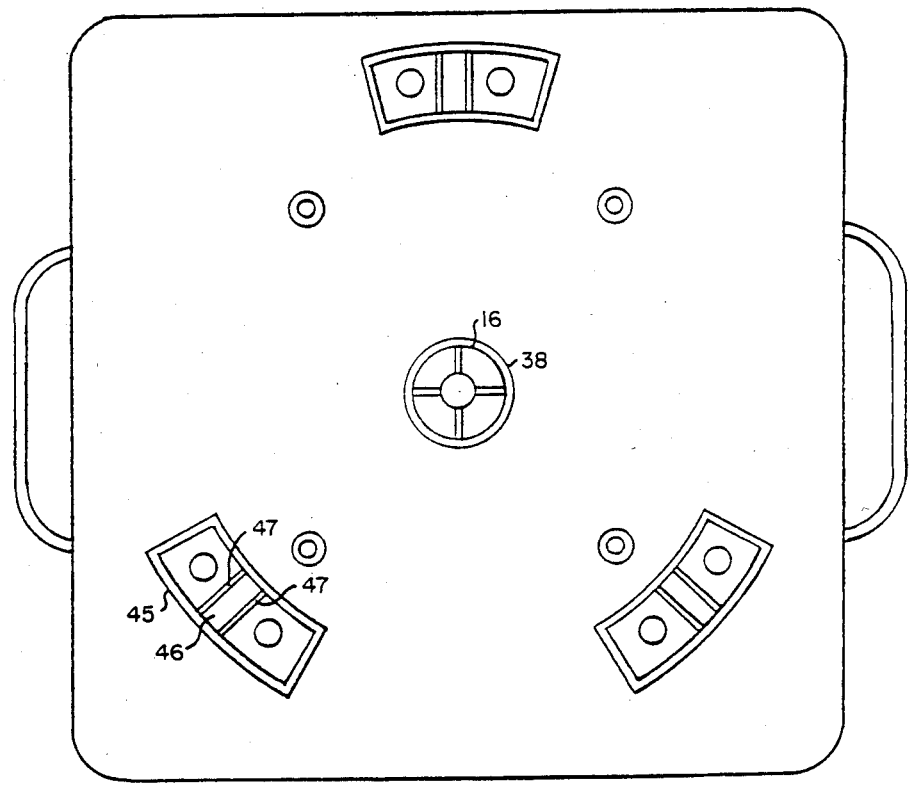
FIG.9

MIXING AND BLENDING APPARATUS

This application is a continuation-in-part of co-pending Application Ser. No. 608,641 filed May 9, 1984, now abandoned.

GENERAL NATURE OF THE INVENTION

This invention relates generally to an improved mixer and blender which is particularly well suited to the mixing of powdered materials in liquids, blending of cooked beans and various sauces, as well as the mixing of viscous food materials.

BACKGROUND OF THE INVENTION

There exists a variety of apparatus for the mixing and blending of liquids and viscous materials. These include mixers or blenders that have rotating impellers as the does the instant invention. Examples of such mixers are shown in the U.S. Pat. Nos. 1,304,349; 1,582,518; 2,159,856; 2,918,264; 3,273,865; and 3,404,870. Problems associated with mixers of this general type include the inadequacy or nonexistence of guide means to facilitate coupling of a mixing container to a separate drive motor that is detachable in normal use. A further problem is the tendancy of fluids from the mixer, or cleaning fluids to enter the motor housing and harm the drive source or cause electrical shorts.

Yet another problem has been the unavailability of quickly assemblable and detachable mounting means which facilitate the ready connection of a motor base to a mixing container.

It has been found according to this invention that the other problems noted in the prior art are solved by the novel coupling, mounting, and spinning disk means of this invention.

According to this invention there is provided a novel disk means which can be fixed to the drive shaft of a motor base and extends over the drive shaft opening in the motor base housing to prevent the entry of liquids from the mixing operation or elsewhere into the motor casing. There is also provided according to the invention a novel coupling means to couple the portion of the drive shaft extending from the motor base to the portion extending from the mixing container. This novel coupling means comprises male and female members where, through means of an outwardly angled portion in the female member, the male member is guided quickly and efficiently into coupling relationship when the mixing container is placed on the motor base. This mixing container placement operation is also facilitated by another feature of the invention wherein there is provided mounting means having fin members on the container and corresponding slot portions on upstanding mounts on the motor base to prevent rotation of the mixing container in use. Mounting is facilitated by angled initial portions of the slot which guide the fins into their respective mount positions.

An object of this invention is the provision of a means for preventing liquids from entering the casing of a motor base which is used to mount and drive a mixing container.

A still further object is the provision of coupling and mounting means which provide for quick assembly and disassembly of the mixing container from the motor base.

These and other objects of the invention were satisfied by the novel mixer and blender of this invention which is described herein.

DESCRIPTION OF THE DRAWINGS

The invention will be more fully understood and described in connection with the drawings in which:

FIG. 6 is a bottom plan view looking in the direction of the arrows 6—6 in FIG. 1;

FIG. 7 is a view in cross-section taken looking in the direction of the arrows 7—7 of FIG. 1;

FIG. 8 is a partial cross-sectional view taken looking in the direction of the arrows 8—8 of FIG. 4; and, FIG. 9 is a top plan view of the motor base taken looking in the direction of the arrows 9—9 of FIG. 1.

DETAILED DESCRIPTION OF THE INVENTION

Figure 1:
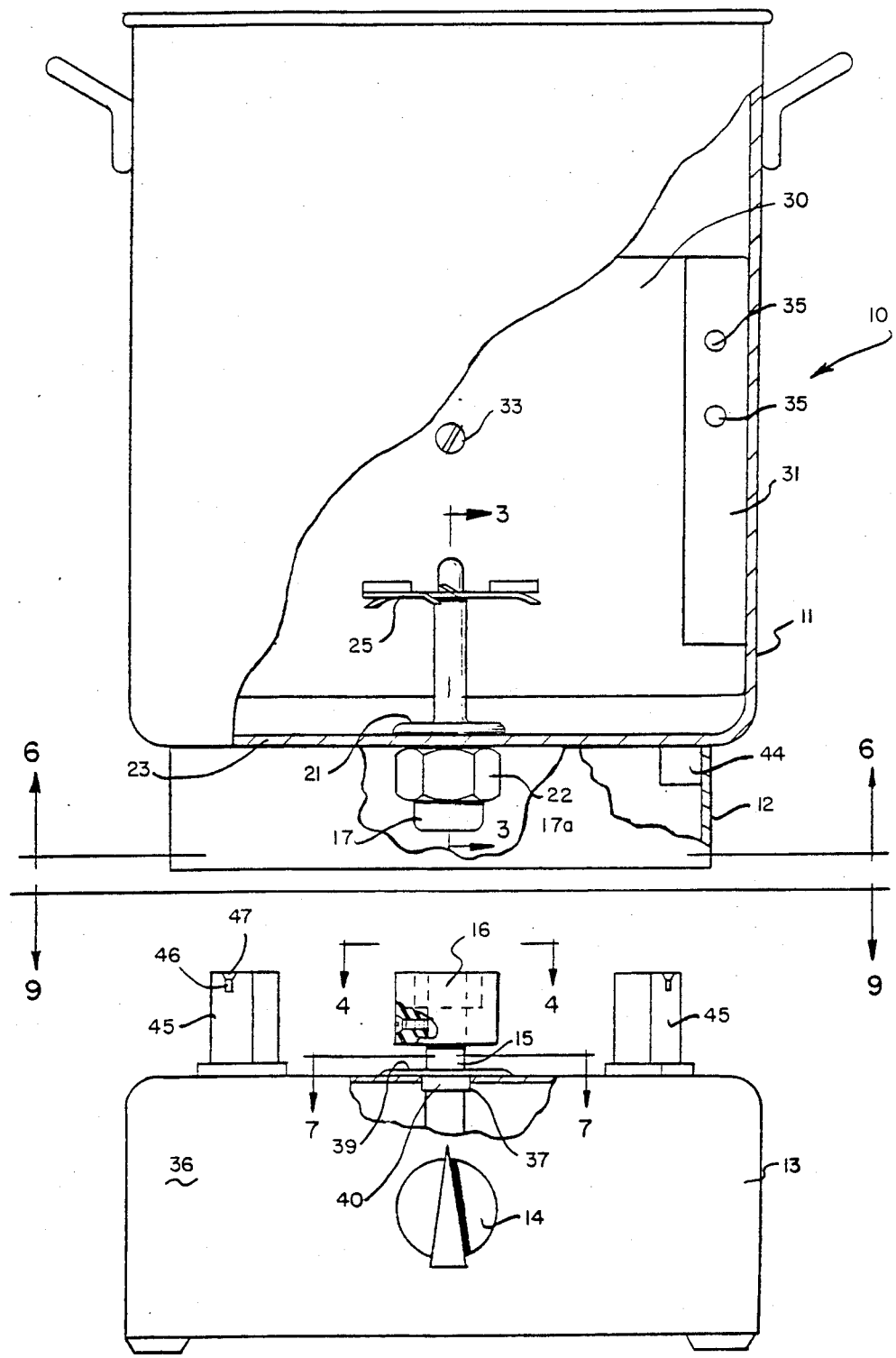
FIG. 1 is a front elevation view of a mixer assembly and electrical motor base showing the mixer of the invention partially broken away to show details of the invention.

As shown in FIG. 1, the mixer 10 comprises a container 11 which is secured to a support member 12 and adapted to be mounted on a motor base 13. An electric motor (not shown) actuated by switch 14 is provided in motor base 13 to operate the mixer 10 with the motor being connected to drive drive shaft 15. Coupling blade 17, which extends downwardly from container 11, is adapted to be driven by drive coupling 16 attached to drive shaft 15 when mixer 10 is mounted on motor base 13.

Figure 3:
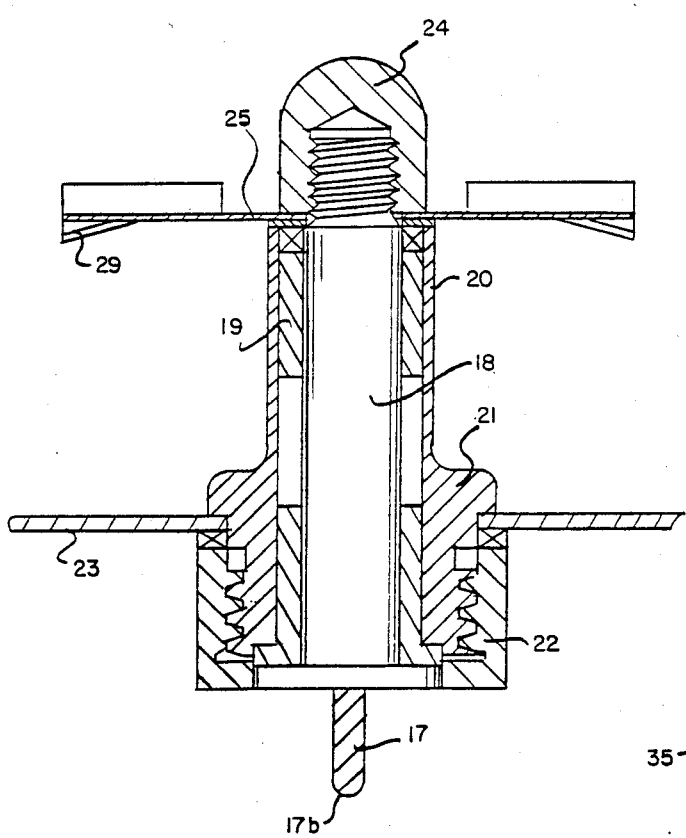
FIG. 3 is a view in enlarged cross-section taken on line 3—3 of FIG. 1.
Figure 4:
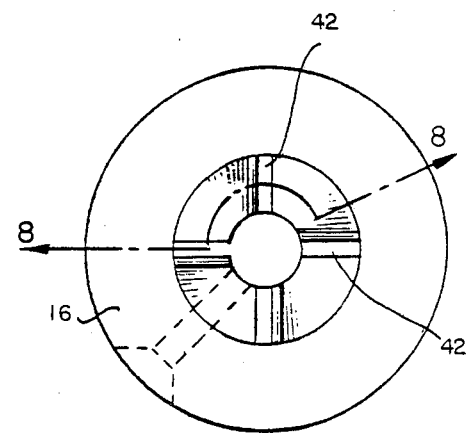
FIG. 4 is an enlarged top view of the mixer drive coupling looking down on line 4—4 of FIG. 1.

Referring now to FIG. 3, it will be seen that coupling blade 17 is attached to impeller drive shaft 18 which is mounted for rotation by bearings 19 within impeller drive shaft casing 20. Flange means 21 on said drive shaft casing 20 are provided to aid in securing casing 20 to the bottom 23 of container 11 with threaded nut 22. At the upper end of impeller drive shaft 18, threaded top nut 24 secures impeller 25 to said drive shaft.

Figure 2:
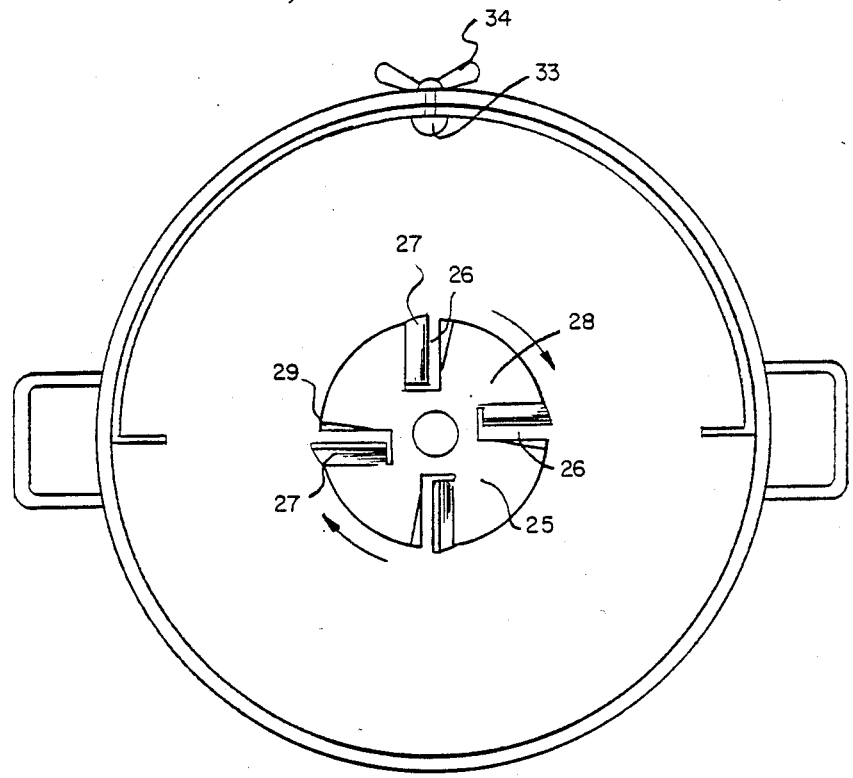
FIG. 2 is a top view of the mixer showing the baffles and blade structures.

Impeller 25 has a unique configuration, as shown in FIG. 2 and FIG. 3. The impeller is provided with four L-shaped cuts 26 disposed 90° apart. The portions of the blade within the L-shaped cut are elevated to form tabs 27, each of which extends upwardly at an angle of about 10° to the plane 28 of the impeller. The portions 29 of the blade adjacent each of the L-shaped cuts are depressed at an angle of about 5° to the plane of the blade.

Figure 5:
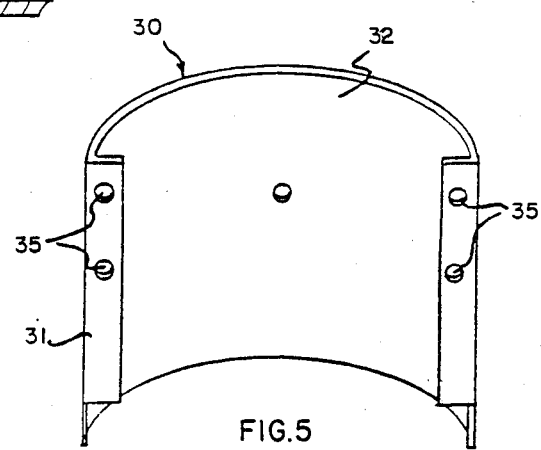
FIG. 5 is a view in perspective of a baffle arrangement.

Disposed within the container 11 is baffle insert 30 as shown in FIG. 5. The baffle insert 30, in a preferred form, is formed of a single piece and includes two baffles 31 and a semi-cylindrical section 32 adapted to fit inside container 11. According to the embodiment shown in FIG. 1 and FIG. 2, the baffle insert 30 is held in position in container 11 by means of threaded fastener 33 and wing nut 34. Baffles 31 are mounted at an angle of about 15° into the flow of the liquid. By this arrangement, the baffles are securely fixed at the proper angle in the container, but the entire baffle insert may be removed from the container for cleaning by removing wing nut 34 and fastener 33.

The baffles 31, as shown, each have two apertures 35. The first, or upper aperture 35, is located at a level of the material to be mixed in the container. The second, or lower aperture 35, is located at least 40% of the axial distance from the plane of impeller 25 to the location of the upper aperture 35. Both apertures are located intermediate the inner and outer edges of baffles 31.

As will be noted from FIG. 1, motor base 13 has a casing 36 with an opening 37 through which drive shaft 15 protrudes. To prevent liquids from the mixer or cleaning liquids from entering casing 36 through opening 37, there is provided in accordance with this invention a disk 38 which fits around drive shaft 15 to be rotated with the drive shaft when the motor is turned on. The disk 38 comprises a planar portion 39 which extends outwardly from drive shaft 15 and covers opening 37. In operation, the spinning disk 38 drives moisture away from opening 37 by spinning liquid or moisture off the planar portion 39. Disk 38 further comprises a collar 40 which is closely positioned within opening 37 to further seal casing 36 against ingress of moisture. The collar extends downwardly around drive shaft 15 and conforms to the configuration of the drive shaft which has a flat surface 41 to prevent independent rotation of disk 39 with respect to drive shaft 15. While collar 40 fits within opening 37, its diameter is sufficiently smaller than the diameter of opening 37 to permit free rotation of drive shaft 15. In a preferred form of the invention, the disk 39 is formed of a flexible rubber material.

There is also provided in accordance with the invention a unique coupling means provided by drive coupling 16 as a female coupling member and coupling blade 17 which extends normal to the bottom of container 11 as a male coupling member. Drive coupling 16 comprises slots 42 which, as best seen on FIG. 8, have an outwardly angled openings 43 which guide coupling blade 17 into slots 42. As shown, blade 17 is rectangular and has arcuate corners, 17a which further serve to guide the blade into slots 42 as does rounded edge 17b as best shown in FIG. 3. In operation, if blade 17 contacts slots 42 on angled surface 43 of the outwardly angled opening, the blade will automatically be positioned in slot 42 as container 11 is forced downwardly on motor base 13. In a preferred form of the invention, there is provided two slots 42 which are at right angles to each other and divide the slotted area of coupling 16 into four quadrants with the opened portion of each slot 42 extending from a point on one wall of the slot outwardly and upwardly to a point adjacent to the wall of the next slot. In this manner, the outwardly angled opening 43 extends substantially the width of each quadrant from the leading edge of one slot to the trailing edge of the next.

On the bottom of container 11 are mounted fins 44, which can be in the formed by angles as shown that are welded to the bottom of container 11 and/or support member 12. As shown in FIG. 6, such fins are three in number placed equally around the periphery of support member 12. Motor base 13 has complimentary upstanding mounts 45, which contain mounting slots 46 and angled portions 47. When container 11 is lowered upon motor base 13, fins 44 will ultimately rest in mounting slots 46 to prevent rotation of the container with respect to the motor base 13. Angled portions 47 of mounting slots 46 serve as a guide for fins 44. These angled portions, together with the outwardly angled opening of slots 42 of drive coupling 16, provide alignment means for container 11 on motor base 13 whereby the container can be easily aligned on the motor base.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A mixer for liquids comprising:
   a. a container;
   b. impeller means mounted in said container for rotation and comprising rotatable impeller blade means for imparting rotational motion with respect to the axis of said impeller to a mixable material in contact therewith;
   c. a motor base having a casing and rotatable drive shaft means adapted to couple with connecting means to rotate said impeller when said container is mounted on said motor base, said drive shaft means extending upwardly from said motor base through an opening in said casing and said drive shaft having a generally circular cross-section and a flattened portion extending on one side thereof; and
   d. a disk means fixed to said drive shaft to rotate therewith above said opening, said disk extending radially outwardly over said opening whereby liquid contacting the upper surface of said disk will be spun off as said disk is rotated said disk having an opening extending therethrough of a corresponding cross-section through which said drive shaft extends whereby said disk can be fitted on said drive shaft in fixed liquid sealing engagement to rotate with said drive shaft.

2. A mixer according to claim 1, wherein said drive shaft has a generally circular cross-section and a flattened portion extending on one side thereof and said disk has an opening of a corresponding cross-section whereby said disk can be fitted on said drive shaft in fixed liquid sealing engagement to rotate with said drive shaft.

3. A mixer according to claim 1 wherein said disk is formed of a flexible material.

4. A mixer according to claim 1 wherein said disk further comprises a collar portion adapted to fit within said opening.

5. A mixer according to claim 1 wherein said disk extends radially outwardly a distance beyond the radial circumference of said connecting means.

6. A mixer for liquids comprising:
   a. a container;
   b. impeller means mounted in said container for rotation and comprising rotatable impeller balde means for imparting rotational motion with respect to the axis of said impeller to a mixable material in contact therewith;
   c. first drive shaft means extending from said container; and comprising a male coupling means adapted to be coupled to a female coupling means;
   d. a motor base having a motor driven rotatable second drive shaft means; and
   e. coupling means adapted to connect said first drive means and said second drive means having male and female members adapted to couple said first and second drive shafts whereby said motor base will drive and impeller, said male member having a flat blade member extending normal to the bottom of said container and said female member having at least one slot therein adapted to receive said flat blade of said male member said slot being of substantially rectangular cross-section to interfit with said flat blade and having an outwardly angled opening portion thereof to guide said blade into said slot when said male and female members are coupled.

7. A mixer according to claim 6 wherein said female member has two slots crossing at right angles to each other forming in said member an area having four quadrants and wherein the outwardly angled open portion of each slot extends from a point on one wall of said slot outwardly and upwardly to a point adjacent the wall of the next slot whereby the opening at the entrance to each slot extends substantially the width of said quadrant.

8. A mixer according to claim 6 wherein said flat blade member is rectangular in shape and has arcuate corner portions to guide said flat blade member into said slots.

9. A mixer according to claim 6 wherein said flat blade has a rounded bottom.

10. A mixer according to claim 5 wherein said container includes at least one downwardly extending fin means located on the base of said container at a peripheral location thereby said fin means extending downwardly normal to the bottom of said container and said motor base includes upstanding container mounting and positioning means, said mounting and positioning means having slot portion thereon adapted to interfit with said downwardly extending fin means to position said container so that said coupling means will be engaged.

11. A mixer according to claim 10 wherein said slot portions of said mounting and positioning means have outwardly angled opening portions thereof to guide said fin into said slot when said container is placed on said motor base.

12. A mixer according to claim 10 wherein three positioning means and three corresponding fin means are located equidistant on the respective peripheries of said container and said motor base.

* * * * *